(12) United States Patent
Citro et al.

(10) Patent No.: US 10,132,598 B2
(45) Date of Patent: Nov. 20, 2018

(54) BALLISTIC PROTECTION STRUCTURES AND DEVICES USING SAID STRUCTURES

(71) Applicants: SAES GETTERS S.P.A., Lainate (IT); GRUPPO ROLD S.P.A., Nerviano (IT)

(72) Inventors: Marco Citro, Varese (IT); Giorgio Vergani, Monza (IT); Paolo Barbatelli, Spoleto (IT)

(73) Assignees: SAES GETTERS S.P.A., Lainate (MI) (IT); GRUPPO ROLD S.P.A., Nerviano (MI) (IT)

( * ) Notice: Subject to any disclaimer, the term of this patent is extended or adjusted under 35 U.S.C. 154(b) by 0 days.

(21) Appl. No.: 15/562,203

(22) PCT Filed: Jun. 7, 2016

(86) PCT No.: PCT/IB2016/053322
§ 371 (c)(1),
(2) Date: Sep. 27, 2017

(87) PCT Pub. No.: WO2016/203344
PCT Pub. Date: Dec. 22, 2016

(65) Prior Publication Data
US 2018/0120062 A1 May 3, 2018

(30) Foreign Application Priority Data
Jun. 15, 2015 (IT) .................. 102015000023820

(51) Int. Cl.
*F41H 5/04* (2006.01)
*F41H 1/02* (2006.01)
(Continued)

(52) U.S. Cl.
CPC ............. *F41H 5/0492* (2013.01); *B32B 7/08* (2013.01); *F41H 1/02* (2013.01); *F41H 1/08* (2013.01); *F41H 7/04* (2013.01); *B32B 2571/02* (2013.01)

(58) Field of Classification Search
CPC . F41H 1/02; F41H 1/08; F41H 5/0492; F41H 7/04; B32B 7/08
See application file for complete search history.

(56) References Cited

U.S. PATENT DOCUMENTS 3,018,210 A     1/1962  Frieder et al.
3,616,126 A  *  10/1971  Tungseth .................. F16F 1/44
                                                    156/166

(Continued)

FOREIGN PATENT DOCUMENTS

EP          0226826 B1      9/1992
WO      2015/011642 A1      1/2015

OTHER PUBLICATIONS

International Search Report and Written Opinion for PCT/IB016/053322 filed Jun. 7, 2016 on behalf of SAES Getters S.P.A. dated Aug. 19, 2016. 10 pages.
(Continued)

*Primary Examiner* — Bret Hayes
(74) *Attorney, Agent, or Firm* — Steinfl + Bruno LLP (57) ABSTRACT

A ballistic protection structure has a first ballistic layer made of a textile of synthetic fibers and a second ballistic layer comprising a first holding element on which slender metallic structures in the form of flat sheets and/or straight filiform elements are restrained. The metallic structures are restrained at different points of the first holding element and protrude therefrom generally perpendicularly. The free ends of the slender metallic structures are restrained to the first textile layer.

21 Claims, 4 Drawing Sheets

(51) Int. Cl.
*F41H 1/08* (2006.01)
*F41H 7/04* (2006.01)
*B32B 7/08* (2006.01)

(56) References Cited

U.S. PATENT DOCUMENTS

| | | |
|---|---|---|
| 4,067,752 A | 1/1978 | Brook et al. |
| 2014/0304877 A1 | 10/2014 | Fonte et al. |
| 2016/0069410 A1* | 3/2016 | Citro .......................... F16F 3/02 188/377 |

OTHER PUBLICATIONS

International Preliminary Report on Patentability for PCT/IB2016/053322 filed Jun. 7, 2016 on behalf of SAES Getters S.P.A. dated Sep. 22, 2017. 25 pages.

* cited by examiner

BALLISTIC PROTECTION STRUCTURES AND DEVICES USING SAID STRUCTURES

CROSS-REFERENCE TO RELATED APPLICATIONS

The present application is the U.S. national stage of International Patent Application PCT/IB2016/053322 filed on Jun. 7, 2016 which, in turn, claims priority to Italian application 102015000023820 filed on Jun. 15, 2015.

The present invention generally relates to ballistic protection systems and in particular to ballistic protection structures suitable to be employed in ballistic protection devices such as e.g. bulletproof vests, soldier helmets and tank bodyworks.

Ballistic protection structures are multilayer structures generally comprising layers of very strong fibers configured to catch and deform a bullet into a dish shape, thus spreading its impact force over a larger and larger portion of the structure. Ballistic structures absorb the energy from the deforming bullet, bringing it to a stop before it can completely penetrate the structure.

Ballistic protection structures such as e.g. bulletproof vests, soldier helmets and parts of a vehicle bodywork have both penetration resistance requirements and limits on the amount of impact energy that is delivered to the body they are intended to protect.

Ballistic protection structures are typically made of textiles of synthetic fibers such as e.g. polyamide and aramid fibers and may also comprise reinforcing plating members made of e.g. steel, titanium, polyethylene, ceramic and fiberglass suitable to enhance protection against impacts from bullets and sharp objects.

The Handbook of Composite Reinforcements by Stuart M. Lee published in 1992 and the Wellington Sears Handbook of Industrial Textiles published in 1995 disclose reinforced panels for shock absorption with particular reference to ballistic impacts.

In recent years, advances in material science have paved the way to the development of softer and lighter ballistic protection structures particularly intended for bulletproof vests, which can stop handgun and rifle bullets without the assistance of additional metal or ceramic plating that generally increase the overall weight of a ballistic protection structure.

For instance, the patent publication US 2014/0304877 A1 discloses a body armor which utilizes a three-dimensional spacer fabric construct made of a shape memory material such as Nitinol as a backing material. The three-dimensional spacer fabric construct serves to reduce the so-called "Behind Armor Blunt Trauma", i.e. the non-penetrating injury resulting from the rapid deformation of a body armor upon a projectile impact onto the front face of the body armor. This deformation is part of the retardation and energy absorbing process that captures the projectile.

The three-dimensional spacer fabric construct made of a shape memory material acts as a fiber mat that absorbs energy via plastic deformation and stretching of the fibers. By particularly exploiting the superelastic behavior of the shape memory material, a body armor comprising the three-dimensional spacer fabric construct can reduce Behind Armor Blunt Trauma.

There is still a need to further improve ballistic protection structures in order to achieve lighter and lighter structures, while enhancing safety of devices employing such structures and reducing shocks and injuries, which is an object of the present invention. Said object is achieved with a ballistic protection structure, whose main features are disclosed in the first claim, while other features are disclosed in the remaining claims.

An idea of solution underlying the present invention is to make a ballistic protection structure comprising at least a first ballistic layer made of a textile of synthetic fibers and at least a second ballistic layer comprising a first holding element on which a plurality of slender metallic structures in the form of flat sheets and/or straight filiform elements are restrained, wherein said metallic structures are restrained at different points of the first holding element and protrude therefrom generally perpendicularly and wherein the free ends of the slender metallic structures are restrained to said first textile layer.

Thanks to their arrangement, the slender metallic structures are arranged so as to absorb energy of impacts acting in a direction perpendicular to planes that are in turn perpendicular to the slender structures, whereby the ballistic protection structure according to the invention exploits the so-called "buckling effect" of the slender metallic structures as a means to dissipate the mechanical energy deriving from an impact. Such a buckling layer allows to achieve a very high degree of deformation, hence mechanical energy absorption, by employing a rather light and mechanically simple structure that can be combined with a prior art textile ballistic layer.

Compared to the three-dimensional spacer fabric construct of US 2014/304877 A1, the ballistic protection structure according to the invention is remarkably simpler, because the slender metallic structures are not knitted so as to form a three-dimensional structure configured to absorb energy via plastic deformation and stretching. Differently, the slender metallic structures are restrained generally perpendicular to the first holding element so as to exploit buckling as energy absorption means upon an impact.

In other words, the different arrangement of the slender metallic structures allows to exploit a different energy absorbing mechanism if compared to the prior art ballistic protection structure of US 2014/304877 A1.

According to the invention, the slender metallic structures need not be perfectly perpendicular to the first holding element, exploitation of the buckling effect being also possible when the slender metallic structures form an angle comprised between 70°-90° relative to the first holding element.

Moreover, in order to exploit the buckling effect to absorb impact energy it is sufficient that at least 90% of the slender metallic structures form an angle comprised between 70°-90° relative to the first holding element.

Compared to prior art ballistic protection structures, the ballistic protection structure of the invention is lighter on equal level of protection, which is particularly advantageous for the manufacturing of bulletproof vests.

The ballistic protection structure of the invention features a high degree of deformability, which advantageously allows to provide it with any desired shape and to use it not only for the manufacturing of bulletproof vest, but also to make items such as soldier helmets, wherein the structure is dome-shaped, or even parts of vehicle bodyworks, which typically have variable curvature depending on the design of the vehicle.

Further advantages and features of the ballistic protection structure according to the present invention will become clear to those skilled in the art from the following detailed and non-limiting description of embodiments thereof with reference to the attached drawings, wherein.

A ballistic protection structure according to the invention is generally indicated by reference numeral 100 and comprises at least a first ballistic layer 110 made of a textile of synthetic fibers such as e.g. woven or laminated aramid fibers, glass fibers or carbon fibers.

According to the invention, the ballistic protection structure further comprises at least a second ballistic layer 120 in turn comprising a first holding element 121 on which a plurality of slender metallic structures 122 in the form of flat sheets and/or straight filiform elements are restrained. The metallic structures 122 are restrained at different points of the holding element 121 and protrude therefrom generally perpendicularly. Hence, the slender metallic structures 122 are generally parallel to each other.

Suitable materials for the manufacturing of the holding element or elements may be metallic, plastic, fabric or polymeric materials.

The slender metallic structures 122 may be restrained to the first holding element 121 by gluing them in respective cavities formed therein, which is preferred when the first holding element 121 is a plate made of a plastic or an elastomeric material such as silicone rubber, or sewn or press-fitted when the first holding element 121 is a textile like e.g. a ballistic textile.

The free ends of the slender metallic structures 122 may be directly restrained to the textile layer 110 e.g. by gluing or sewing. Alternatively, the second layer 120 may comprise a second holding element 123 to which the slender metallic structures 122 are restrained, the second holding member 123 being in turn restrained to the textile layer 110.

The overall configuration of the ballistic protection structure according to the invention is such that the slender metallic structures forming the second ballistic layer 120 are arranged so as to absorb along their length, i.e. axially in the case of straight filiform elements, impact forces acting substantially perpendicular to the first ballistic layer 110 and to the first, and optionally the second, holding member.

This configuration allows to exploit the so called "buckling effect" of slender structures as a means to absorb the mechanical energy caused by an impact force. In science, buckling is a mathematical instability leading to a failure mode of a slender structure that is subject to a compressive stress. Theoretically, buckling is caused by a bifurcation in the solution to the equations of static equilibrium. At a certain stage under an increasing compressive load, further load is able to be sustained in one of two states of equilibrium: a purely compressed state (with no lateral deviation) or a laterally-deformed state.

By making the slender metallic structures of a metallic material capable to withstand large deformations, it is thus possible to absorb a high amount of mechanical energy.

According to the invention, the slender metallic structures 122 need not be perfectly perpendicular to the first holding element 121, exploitation of the buckling effect being also possible when the slender metallic structures 122 form an angle comprised between 70°-90° relative to the first holding element 121, i.e. they may be inclined up to 20° relative to a direction perpendicular to the first holding member 121.

Moreover, in order to exploit the buckling effect to absorb impact energy it is sufficient that at least 90% of the slender metallic structures 122 form an angle comprised between 70°-90° relative to the first holding element 121.

Metallic materials particularly suitable to be used for the slender metallic structures are harmonic steel, aluminum and its alloys, copper and its alloys, titanium and its alloys, magnesium and its alloys, as well as nickel and its alloys.

Smart metals are particularly suitable for the manufacturing of the slender metallic structures of the ballistic protection structure of the invention. Smart metals comprise superelastic alloys and shape memory metals, the latter being also known in the filed with the acronym "SMA". These materials are widely known in the field and e.g. described in the European patent EP 0226826 B1, which concerns superelastic and shape memory Ni—Ti alloys.

Although various composition of smart metals (SMA and superelastic) are known, the smart metals mostly used in the field are those based on Ni—Ti alloys, wherein nickel and titanium form at least 70 wt % of the alloy. The most common alloy comprises from 54% to 55.5% by weight of nickel, balance titanium (traces of other components are possible, typically their overall content being less than 1 wt %).

These alloys are usually fully characterized not only by their composition, but also by their behavior when subjected to a heating process (typically by supplying them with a controlled current), that causes their transition between the two stable phases (Austenite, Martensite). In particular As and Af are the start and finish temperature at which the Austenitic phase transformation starts, and Ms and Mf are instead the ones characterizing the Martensitic phase; more details and information on the behavior of alloys that undergo reversible austenitic-martensitic transformations, such as Nitinol, can be found in various publications, such as for example the U.S. Pat. No. 4,067,752.

It is known that SMA materials can revert to their original shape when subjected to a heating treatment, so in the ballistic protection structure according to the present invention they may be used to restore the original shape of the second ballistic layer or employed jointly with other materials exhibiting higher elasticity such as the superelastic alloys as witness that a deformation of the second ballistic has occurred.

According to the invention, at least the 80%, and preferably at least 95%, of the slender metallic structures 122 are made of a superelastic alloy, e.g. Nitinol, the rest being e.g. made of a shape memory alloy. The use of slender metallic structures made of a shape memory alloy is advantageous in that they may act as "reversible witnesses" of an impact and may even recover their original shape by Joule effect upon heating.

Combined with the energy absorbing action of prior art ballistic textiles such as e.g. those made of aramid fibers it is thus possible to achieve improved ballistic protection structures featuring a higher capability to absorb mechanical energy and reduce shocks and injuries than prior art ballistic textiles while substantially maintaining their softness and light weight.

The mutual distance between the slender metallic structures 122 is lower than 0.4 times their length, the distance being measured with respect to the ends of the metallic structures 122 restrained to the first holding member 121. Such a configuration allows to achieve a relatively high number of slender metallic structures 122 per unit area, which effectively contributes to prevent penetration of objects like bullets into the structure.

In order to properly exploit buckling, the slender metallic structures 122 are restrained to the first holding member 121 and possibly also to a second holding member 123 generally perpendicular thereto. The slender metallic structures 122 are thus substantially parallel to each other, but inclined arrangements wherein the mutual inclination ranges between 0° and 20° may also be made, as it will be clear from the description of the embodiments set forth below.

For clarity's sake, dimensions and dimensional ratios of the various parts shown in the drawings have been altered, with particular and non-exclusive reference to the height and width of the slender metallic structures.

Figure 1:
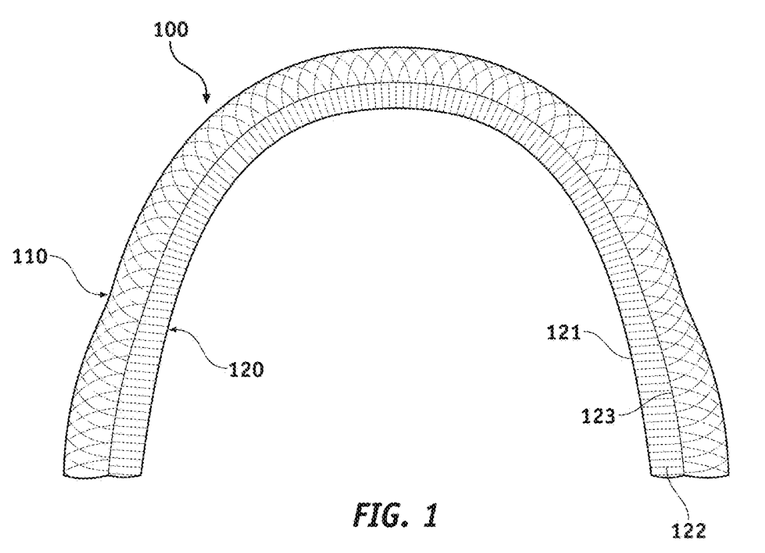
FIG. 1 schematically shows a cross-section of a ballistic protection structure according to a first embodiment of the invention, said structure being configured as a part of a soldier helmet.

Referring to FIG. 1, a ballistic protection structure configured as a soldier helmet shell is shown.

The soldier helmet comprises a ballistic protection structure 100 in turn comprising a first ballistic layer 110 forming an outer surface of the shell, whereas the second ballistic layer 120 forms an inner layer of the shell intended to face a user's head.

The first ballistic layer 110 is made of a textile of synthetic fibers such as e.g. woven or laminated aramid fibers. The thickness of the first ballistic layer depends on the protection level required. A suitable thickness of this layer may e.g. be comprised between 7 and 8 mm, which may be obtained according to prior art techniques by superimposing and restraining a number of layers of woven or laminated aramid fibers, e.g. between 5 and 50 layers.

The second ballistic layer 120 comprises a first holding element 121 facing the inside of the helmet shell and a plurality of slender metallic structures 122 stretching out perpendicularly from the first holding element 121 and connecting it to the first ballistic layer 110. Connection between the first and second ballistic layers 110, 120 may be made by directly restraining the free ends of the slender metallic structures 122 to the first ballistic layer 110 e.g. by gluing or press-fitting. Alternatively, as shown in FIG. 1, the second ballistic layer 120 may comprise a second holding member 123 to which the free ends of the slender metallic structures 122 are fixed, said second holding member 123 being in turn restrained, e.g. glued, to the first ballistic layer.

The first and second holding members 121, 123 may be made of e.g. an elastomeric material such as e.g. silicone rubber, which allows to assemble the second ballistic 120 layer in a flat configuration, which entails fitting and restraining the slender elements 122 between the first and second holding members 121, 123, and to easily provide the second ballistic layer 120 with a dome shape so as to fit it into the helmet shell.

The slender metallic structures 122 are preferably straight filiform elements, which allows the second ballistic layer 120 to be easily shaped like a dome so as to be fitted and coupled to the helmet outer shell 110 formed by the first ballistic layer 110.

The diameter of the straight filiform elements 122 is comprised between 75 and 350 μm and their length may be of about 20 mm, which results in a slenderness ratio of about 800 calculated with the Euler formula.

The second ballistic layer 120 may comprise up to 60 straight filiform elements per square centimeter, which represents a good compromise between ease of assembly and a density of slender metallic structures allowing to effectively counteract penetration objects like bullets into the ballistic protection structure 100.

Although only the first and second ballistic layers 110, 120 are shown, the helmet of FIG. 1 may comprise further layers such as e.g. a metal or ceramic layer e.g. arranged above the first ballistic layer 110 so as to achieve a higher protection level.

Figure 2:
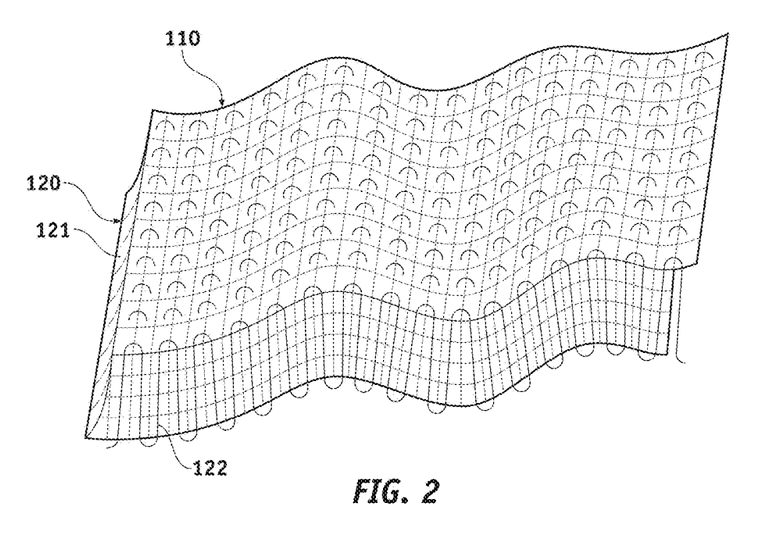
FIG. 2 schematically shows a cross-section of a ballistic protection structure according to a second embodiment of the invention, said structure being configured as a part of a bulletproof vest.

FIG. 2 shows a second embodiment of the invention wherein the ballistic protection structure 100 is configured as a part of a bulletproof vest.

Similarly to the embodiment of FIG. 1, the first ballistic layer 110 is made of a textile of synthetic fibers such as e.g. woven or laminated aramid fibers. Also in this case the thickness of the first ballistic layer depends on the protection level required. A suitable thickness of this layer may e.g. be comprised between 2 and 3 mm, which may be obtained by superimposing and restraining a number of layers of woven or laminated aramid fibers according to prior art techniques.

The second ballistic layer 120 comprises a first holding element 121 and a plurality of slender metallic structures 122 stretching out perpendicularly therefrom and connecting it to the first ballistic layer 110. The first holding element 121 may be made of a textile of synthetic fibers such as e.g. woven or laminated aramid fibers similarly to the first ballistic layer 110 and have the same thickness of 2-3 mm. The slender metallic structures are formed by sewing a continuous wire made of a superelastic alloy such as e.g. Nitinol to the first holding member 121 and the first ballistic layer 110. The slender metallic structures stretch out perpendicularly between the first holding member 121 and the first ballistic layer 110 so as to allow buckling upon impact compression forces acting on the first ballistic layer 110.

The diameter of the slender metallic structures is preferably comprised between 0.05 and 0.3 mm, while their height is comprised between 0.5 and 3 mm, which gives a slenderness ratio of about 160 calculated with the Euler formula.

Sewing of the slender metallic structures allows to achieve a density higher than 60 straight filiform elements per square centimeter, also in this case effectively contributing to counteract penetration of objects like bullets into the ballistic structure.

Hence, the overall configuration of the ballistic protection structure 100 according to the embodiment of FIG. 2 is that of a soft, light and highly deformable structure particularly suited to the manufacturing of bulletproof vests.

Figure 3:
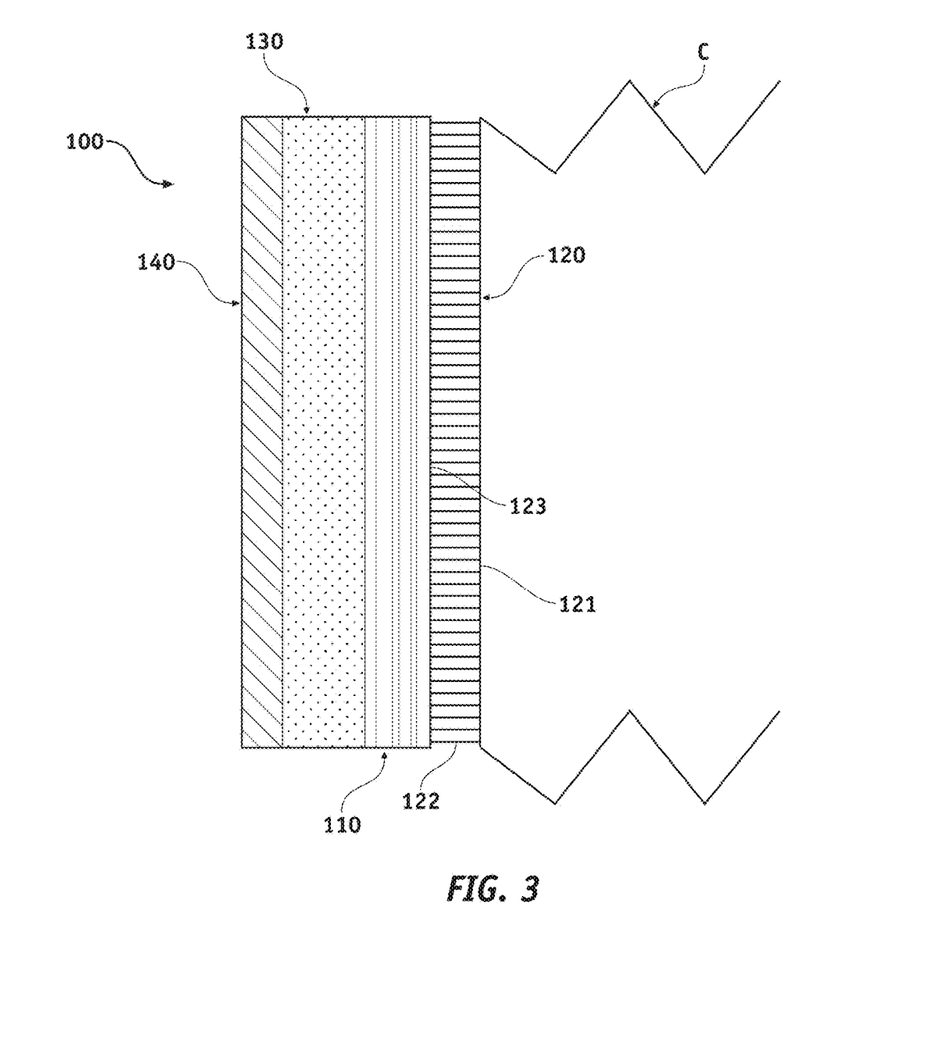
FIG. 3 schematically shows a cross-section of a ballistic protection structure according to a third embodiment of the invention, said structure being configured as a part of a vehicle bodywork.

Now turning to FIG. 3, according to a further embodiment of the invention the ballistic protection structure may also be employed as a part of a bodywork for vehicles such as e.g. cars or tanks.

As shown in FIG. 3, also in this case the ballistic protection structure comprises a first ballistic layer 110 made of a textile of synthetic fibers such as e.g. woven or laminated aramid fibers. The thickness of the first ballistic layer depends on the protection level required and may e.g. be in the order of 10 mm obtained by superimposing and restraining a number of layers of woven or laminated aramid fibers according to prior art techniques.

The second ballistic layer 120 comprises a first holding element 121 intended to be mounted on the body of a vehicle, e.g. onto the chassis C, and a plurality of slender metallic structures 122, preferably in the form of straight filiform elements, stretching out perpendicularly therefrom and connecting it to the first ballistic layer 110. Similarly to the embodiment of FIG. 1, connection between the first and second ballistic layers 110, 120 may be made by directly restraining the free ends of the slender metallic structures 122 to the first ballistic layer 110 e.g. by gluing or press-fitting. Alternatively, as shown in FIG. 3, the second ballistic layer 120 may comprise a second holding member 123 to which the free ends of the slender metallic structures 122 are fixed, said second holding member 123 being in turn restrained, e.g. glued, to the first ballistic layer.

The length of the slender metallic structures in this case may be of e.g. 15-20 mm, while their diameter may be of e.g. 0.35-0.6 mm, which gives a slenderness ratio of about 340 calculated with the Euler formula.

Further protective layers may advantageously be attached to the first ballistic layer 110 in order to enhance protection, such as e.g. a ceramic layer 130 restrained e.g. by gluing to the first ballistic layer 110 and possibly also a metal layer 140 restrained to the ceramic layer 130 e.g. by gluing.

In order to test effectiveness of the ballistic protection structure according to the invention, two test samples made according to the invention and a comparative test sample made according to the prior art were built and subjected to a compression test in a compression unit.

Figure 4:
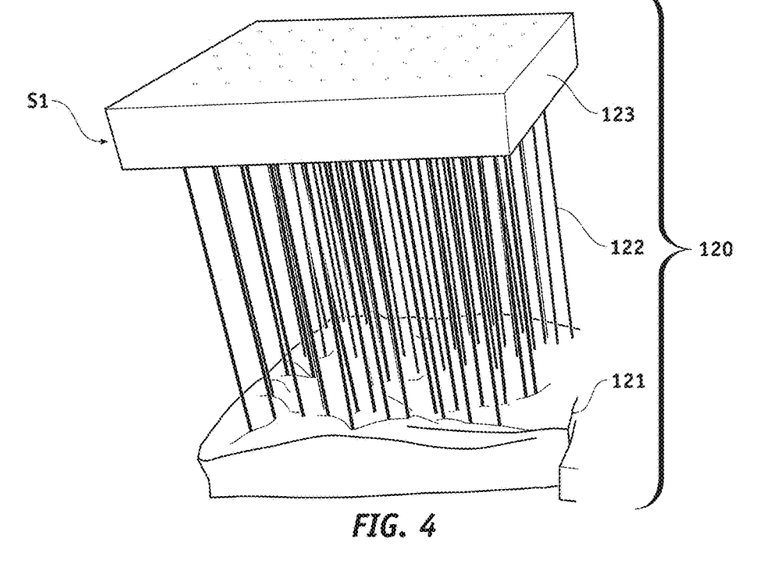
FIG. 4 is a drawing of a first test sample of a ballistic protection structure according to the present invention.

A first test sample S1 of a ballistic protection structure according to the present invention was built by employing sixty straight superelastic Nitinol wires as slender metallic structures 122. The superelastic Nitinol wires had a diameter of 300 µm and a length of 34 mm.

The superelastic Nitinol wires were restrained to a first holding member 121 made of an acrylic-based photopolymer used for prototyping purposes commercially available under the trade name FullCure Verogray 850. The first test sample S1 also comprised a second holding member 123 made of silicone.

The first and the second holding members 121, 123 had a square base whose sides was 30 mm long and a thickness of 5 mm.

FIG. 4 shows a drawing of the first test sample S1.

A second test sample S2, not shown in the drawings and having the same structure of the first test sample S1 was built. The only difference between test sample S1 and test sample S2 was that the sixty straight superelastic Nitinol wires of the latter had a length of 26 mm instead of 34 mm, hence they were shorter than the wires of the first test sample S1.

A third, comparative test sample S3 was built by employing the similar first and second holding members 121, 123 and the same type of superelastic Nitinol wires having a diameter of 300 µm. However, as show in FIG. 5, the comparative test sample S3 features a "trestle" configuration wherein the wires 122 are inclined relative to the first holding member 121 and form an angle of 45° therewith.

The third, comparative test sample S3 represents an example of a prior art ballistic protection structure according to the above mentioned patent application US 2014/304877 A1.

Figure 5:
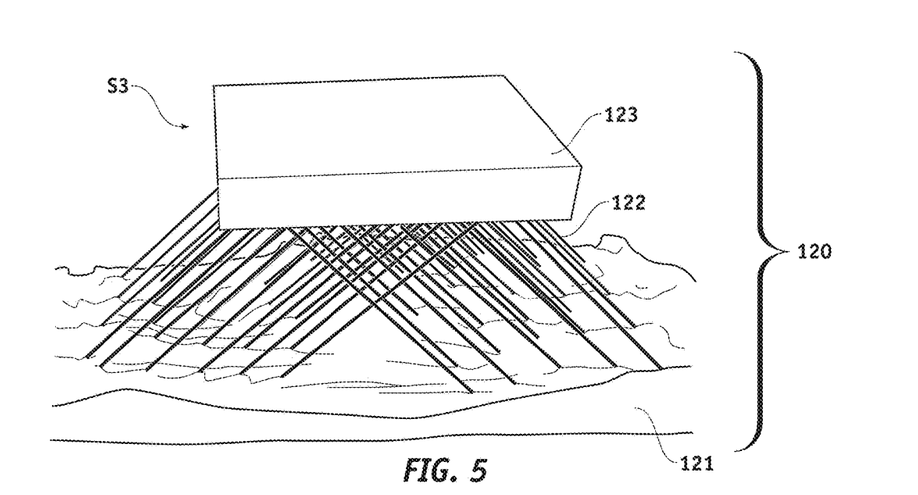
FIG. 5 is a drawing of a second test sample of a ballistic protection structure according to the prior art.

The height of the comparative test sample S3 was 26 mm, similarly to the second test sample S2. Due to the different inclination of the wires 122, the first holding member 121 had a rectangular shape, the larger side of which was 70 mm long.

As it may be appreciated in FIGS. 4 and 5, none of the test samples had a first ballistic layer 110, because the aim of the tests was to measure and compare the energy absorption abilities of the three samples as far as the second ballistic layer 120 was concerned.

The three test samples were mounted on a compression testing unit commercially available under the trade mark Instron. This compression testing unit was provided with a 500 N load cell.

More particularly, the first and second holding members 121, 123 of each test sample were restrained to opposite plates of the compression testing unit in an uncompressed condition, i.e. by setting the plates at a distance of 34 mm and 26 mm, respectively. Each test sample was then compressed by 10 mm at the speed of 2 mm per minute and then released so as to recover its original height. The tests were performed at room temperature.

Figure 6:
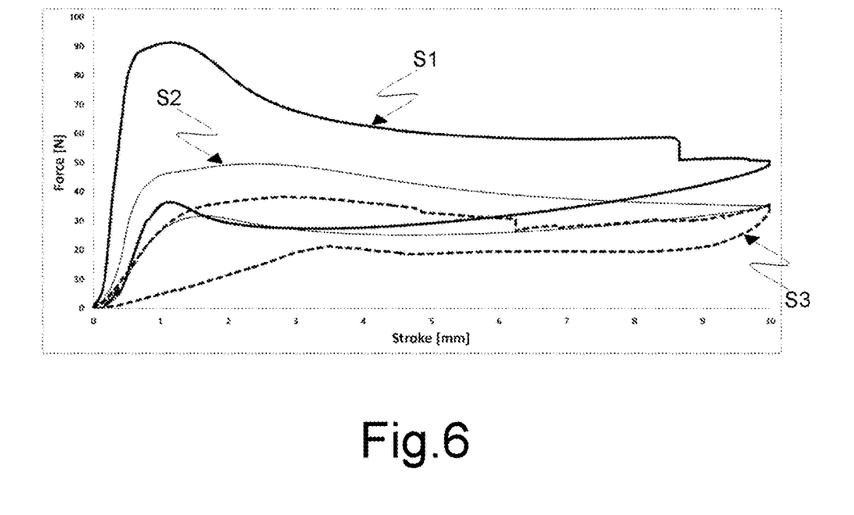
FIG. 6 is a chart comparing the results of compression tests carried out on the samples of FIGS. 4 and 5.

FIG. 6 is a chart showing the results of the compression tests of the three samples. The curve 1 shown in continuous thick line represents the hysteretic cycle of the test sample S1, the curve 2 shown in continuous thin line represents the hysteretic cycle of the test sample S2, while the curve 3 in dotted lines represents the hysteretic cycle of the comparative test sample S3. It will be appreciated that test samples S1 and S2 made according to the invention feature a higher stiffness than the comparative test sample S3 (leftmost portion of the respective hysteresis curves) due to the arrangement of the slender metallic structures, i.e. the Nitinol wires, perpendicular to the respective first holding members. The comparative sample S3 instead features a lower stiffness because its slender metallic structures are more easily bendable due to their inclined arrangement relative to the first holding member.

It will also be appreciated that test samples S1 and S2 are characterized by a larger hysteresis area than the comparative test sample S3. This is due to the fact that test samples S1 and S2 exploit the buckling effect of their slender metallic structures, whereas the inclined arrangement of the slender metallic structures of the comparative sample S3 is not suitable for this purpose and the wires are subjected to bending only, which results in a smaller hysteresis area.

The buckling energy absorbing effect is particularly shown by the meniscus following the initial, almost linear portion of the hysteretic curves of test samples S1 and S2, which represents the stroke/deformation level at which buckling of the slender metallic structures occurs.

FIG. 6 also clearly shows that the longer slender metallic structures of the first test sample S1 (34 mm height) allow to achieve a higher energy absorption (area of the hysteretic cycle curve) than the shorter slender metallic structures of the test sample S2 (26 mm height), because of the higher slenderness ratio.

The invention has been disclosed with reference to preferred embodiments thereof. Those skilled in the art will understand that there may be further embodiments relating to the inventive idea as defined by the claims set forth below.

The invention claimed is:

1. A ballistic protection structure comprising:
at least one first ballistic layer made of textile of synthetic fibers; and
at least one second ballistic layer comprising a first holding element on which a plurality of slender metallic structures in the form of flat sheets and/or straight filiform elements are restrained,
wherein:
essentially all of said slender metallic structures are restrained at different points of the first holding element and essentially all of said slender metallic structures comprise free ends, the free ends of the slender metallic structures are restrained to said first textile layer, the slender metallic structures protrude perpendicularly from the first holding element, the slender metallic structures are arranged to absorb by buckling the energy of impacts acting in a direction perpendicular to planes that are in turn perpendicular to the slender structures, at least 90% of the slender metallic structures form an angle comprised between 70° and 90° relative to the first holding element, and the slender metallic structures are made of a smart metal.

2. The ballistic protection structure according to claim 1, wherein the free ends of the slender metallic structures are directly restrained to said at least one first ballistic layer.

3. The ballistic protection structure according to claim 2, wherein the free ends of the slender metallic structures are restrained to the at least one first ballistic layer by gluing or sewing.

4. The ballistic protection structure according to claim 1, wherein the at least one second ballistic layer comprises a second holding element to which the free ends of the slender metallic structures are restrained, said second holding element being in turn restrained to the at least one first ballistic layer.

5. The ballistic protection structure according to claim 1, wherein at least 80% of the slender metallic structures are made of a superelastic alloy.

6. The ballistic protection structure according to claim 1, wherein a mutual distance between the slender metallic structures is lower than 0.4 times their length, said distance being measured with respect to the free ends of the slender metallic structures restrained to the first holding element.

7. The ballistic protection structure according to claim 1, wherein the first and second holding elements of the at least one second ballistic layer are made of metallic, plastic, fabric or polymeric materials.

8. A soldier helmet comprising a shell and the ballistic protection structure according to claim 1, wherein said at least one first ballistic layer forms an outer surface of the shell and the at least one second ballistic layer forms an inner layer of the shell configured to face a user's head.

9. The soldier helmet according to claim 8, wherein the first holding element faces the inside of the helmet shell and the second holding element is glued to the at least one first ballistic layer.

10. The soldier helmet according to claim 9, wherein the first and second holding elements are made of an elastomeric material.

11. The soldier helmet according to claim 9, wherein the slender metallic structures are straight filiform elements having a diameter between 75 and 350 micrometers and a length of 20 mm, and wherein the at least one second ballistic layer comprises up to 60 straight filiform elements per square centimeter.

12. A bulletproof vest comprising a ballistic protection structure according to claim 1, wherein said at least one first ballistic layer forms an outer surface of the vest and the at least one second ballistic layer forms an inner layer configured to face a user's body.

13. The bulletproof vest according to claim 12, wherein the at least one first ballistic layer is made of a textile of synthetic fibers, and the slender metallic structures are formed by a continuous wire made of a superelastic alloy sewn to the first holding member and the at least one first ballistic layer.

14. The bulletproof vest according to claim 13, wherein a diameter of the slender metallic structures is between 0.05 and 0.30 mm, and their height is between 0.5 and 3 mm.

15. A vehicle bodywork comprising the ballistic protection structure according to claim 1, wherein the at least one first ballistic layer is made of a textile of synthetic fibers and the at least one second ballistic layer is configured to be mounted on the bodywork.

16. The vehicle bodywork according to claim 15, wherein the at least one second ballistic layer comprises a second holding element to which the free ends of the slender metallic structures are fixed, said second holding element being in turn restrained to the at least one first ballistic layer.

17. The vehicle bodywork according to claim 15, wherein the slender metallic structures are straight filiform elements, having a length between 15 and 20 mm, and a diameter between 0.35 and 0.6 mm.

18. The vehicle bodywork according to claim 15, further comprising additional protective layers made of a ceramic or a metal material attached to the at least one first ballistic layer.

19. The ballistic protection structure of claim 1, wherein the plurality of slender metallic structures is in the form of straight filiform elements.

20. The ballistic protection structure of claim 1, wherein each of said slender metallic structures are restrained at different points of the first holding element and each of said slender metallic structures comprise free ends.

21. A ballistic protection structure, comprising:
a first ballistic layer made of textile of synthetic fibers; and
a second ballistic layer comprising a first holding element on which a plurality of slender metallic structures in the form of flat sheets and/or straight filiform elements are restrained,
wherein the free ends of the slender metallic structures are restrained to the first ballistic layer,
wherein the slender metallic structures protrude perpendicularly from the first holding element,
wherein the slender metallic structures are arranged to absorb by buckling the energy of impacts acting in a direction perpendicular to planes that are in turn perpendicular to the slender structures,
wherein at least 90% of the slender metallic structures form an angle comprised between 70° and 90° relative to the first holding element, and the slender metallic structures are made of a smart metal, and
wherein at least 90% of the slender metallic structures are restrained at different points of the first holding element and comprises free ends and, the free ends of the slender metallic structures are restrained to said first textile layer.

* * * * *